Figures 1, 2, 3:
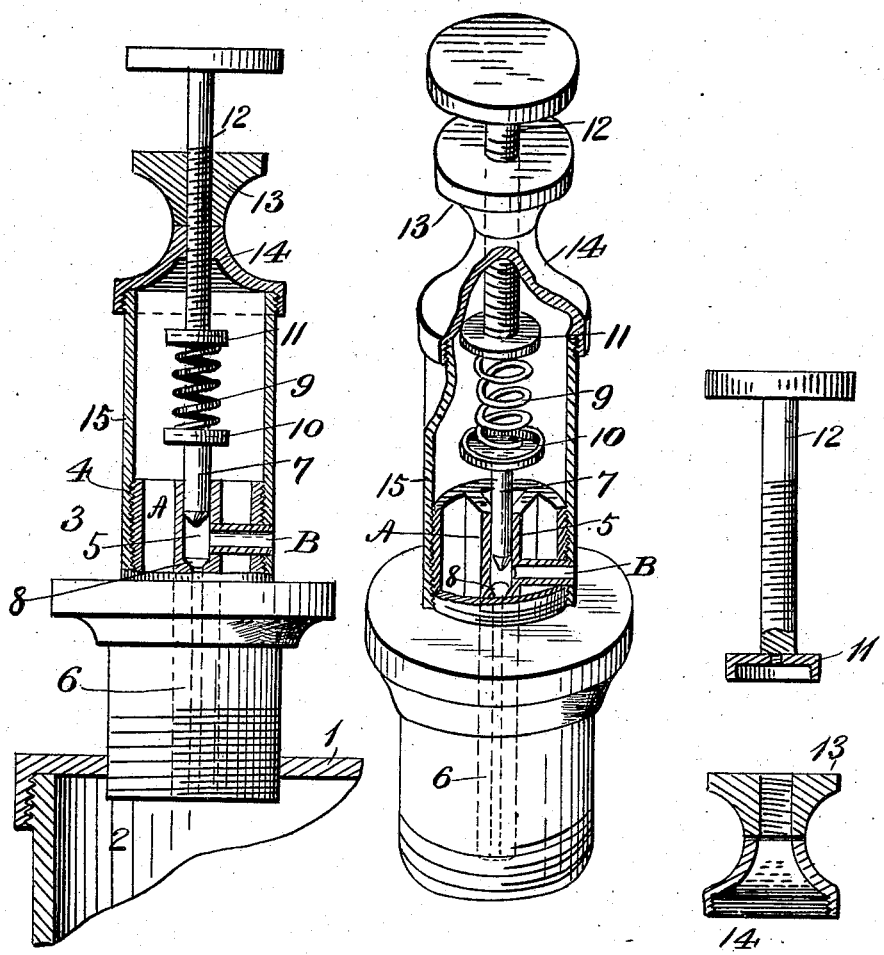

No. 854,908. PATENTED MAY 28, 1907.
J. C. POGUE.
SAFETY VALVE.
APPLICATION FILED APR. 23, 1906.

Witnesses:

Inventor:
J. C. Pogue,
by
Attorneys.

UNITED STATES PATENT OFFICE.

JAMES CHESTER POGUE, OF FINDLAY, ILLINOIS.

SAFETY-VALVE.

No. 854,908.      Specification of Letters Patent.      Patented May 28, 1907.

Application filed April 23, 1906. Serial No. 313,346.

*To all whom it may concern:*

Be it known that I, JAMES CHESTER POGUE, a citizen of the United States, residing at Findlay, in the county of Shelby and State of Illinois, have invented certain new and useful Improvements in Safety-Valves, of which the following is a specification.

My invention relates to improvements in what may be called dental vulcanizers. Its object is to provide more especially for the automatic control of the action of the vulcanizer for the proper carrying out of the vulcanizing operation, accordingly preventing the production of defective work or plates; and to secure that end in a simple, economic or effective manner.

Said invention consists of certain structural features substantially as hereinafter fully disclosed and specifically pointed out by the claims.

In the accompanying drawing illustrating the preferred embodiment of my invention: Figure 1 is a perspective view of the cap, parts being broken away with said invention applied thereto. Fig. 2 is an enlarged sectional view thereof, as applied to a dental vulcanizer pot, showing more particularly the novel features of the invention. Fig. 3 shows disassembled views of the set or jam or lock nut and the adjusting nut for the blow-off or safety valve.

In carrying out the invention, I provide the usual vulcanizer cap 1, fitting the pot 2, with a valve 3 for automatically blowing off excess of steam pressure from said pot, the practical working pressure of which being eighty pounds to the square inch, or three hundred and twenty degrees, Fahrenheit. Said valve comprises generally a screw threaded upward tubular extension or nozzle 4 of the cap 1 having centrally extending therethrough a passage 5, itself communicating with a downward extended passage 6 of said cap, opening into the pot 2, and the valve proper 7 of needle type fitting the passage 5 and normally held in the suitably ground seat 8 of the passage extension 6 by a preferably helical spring 9. Said passage 5 has connecting therewith a lateral outlet passage B opening out through the parts A and 15 for the ready escape of the excess of steam pressure as the valve blows off or exhausts. Said spring is sandwiched between cup-like or recessed disks 10, 11, one being integral with the upper end of the valve proper 7, and the other receiving a reduced lower end projection of an adjusting screw 12 having screw threaded connection with, and passing through, a jam or lock nut 13 and the threaded neck or upper end 14 of the valve casing 15 screwed upon the nozzle or upward extension A of the cap 1.

The spring 9 is tensioned in accordance with the normal pressure required within the pot 2 for the automatic opening or unseating of the valve proper 7 under an excess of pressure therein, as will be readily understood, for the escape of such pressure excess, accordingly controlling the action of the vulcanizer and preventing, during the vulcanizing operation, defective vulcanization of a dental plate under treatment. The upper spring holding disk is held in position by the adjusting screw 12 and is, therefore, together with the spring, under the control of said screw, the purpose of which is obvious. The jam or lock nut 13 screwed firmly down upon the member 14 provides, as is apparent, for the requisite adjustment or positioning of the adjusting screw, after having suitably tensioned the spring. Also by this device, not only does it serve automatically as a safety or blow-off valve, as will have been learned from the above it does, but it may be manually manipulated, after the vulcanizing operation has been concluded, to discharge or permit the escape of the steam from the vulcanizer, to allow the removal of the treated plate from the vulcanizer, without disturbing the set-tension point of adjustment of the valve retaining spring, the same being maintained by the lock or jam nut, as above noted since the latter is not actuated in the unscrewing of said adjusting screw.

I claim:

A device of the character described, comprising a vulcanizer-pot cap having a tube extension extending practically through it, downward and upward beyond the lower and upper surface of its bottom portion, said cap having an upper shell-like extension of much greater diameter than said tube-extension and having a perimetric screw-threaded surface out through which opens a lateral outlet-passage of said tube-extension, a valve-chamber casing screwed to said perimetric surface, and having an upper end neck-member provided with an internally screw-threaded passage, a needle-valve seated in the upper portion of said tube-extension, an adjusting screw engaging said internally screw-threaded passage, and a spring arranged between disks, one resting upon said needle-pointed valve and the other carried by said adjusting screw, and a jam-nut fitted upon the latter and bearing upon said neck-members.

In testimony whereof I have signed my name to this specification in the presence of two subscribing witnesses.

JAMES CHESTER POGUE.

JOHN H. SAYLOR,
J. E. DAZEY.